US009427883B2

(12) United States Patent
Zhu

(10) Patent No.: US 9,427,883 B2
(45) Date of Patent: Aug. 30, 2016

(54) DEVICE AND METHOD FOR MANUFACTURING PROFILE COMBINATION

(71) Applicant: Ningbo Bangda Intelligent Parking System Co., Ltd., Ningbo (CN)

(72) Inventor: Jianhua Zhu, Ningbo (CN)

(73) Assignee: Ningbo Bangda Intelligent Parking System Co., Ltd., Ningbo (CN)

( * ) Notice: Subject to any disclaimer, the term of this patent is extended or adjusted under 35 U.S.C. 154(b) by 388 days.

(21) Appl. No.: 13/971,894

(22) Filed: Aug. 21, 2013

(65) Prior Publication Data

US 2013/0333535 A1 Dec. 19, 2013

Related U.S. Application Data

(63) Continuation-in-part of application No. PCT/CN2011/002041, filed on Dec. 7, 2011.

(30) Foreign Application Priority Data

Feb. 22, 2011 (CN) .......................... 2011 1 0044389

(51) Int. Cl.

| | |
|---|---|
| ***B23B 13/00*** | (2006.01) |
| ***B26D 9/00*** | (2006.01) |
| ***B21D 47/04*** | (2006.01) |
| ***B26D 5/02*** | (2006.01) |
| ***B26D 5/08*** | (2006.01) |
| ***B21D 35/00*** | (2006.01) |
| *B23B 13/12* | (2006.01) |

(52) U.S. Cl.

CPC ................. *B26D 9/00* (2013.01); *B21D 35/00* (2013.01); *B21D 47/04* (2013.01); *B26D 5/02* (2013.01); *B26D 5/08* (2013.01); *Y10T 83/04* (2015.04); *Y10T 83/6484* (2015.04); *Y10T 83/6491* (2015.04)

(58) Field of Classification Search

CPC ........ B23Q 1/763; B23Q 3/10; B23Q 3/105; B23Q 7/00; B23Q 5/22; B23Q 5/34; B23Q 2705/18; B23B 13/028; B23B 13/126; B23B 13/027; B26D 5/02; B26D 5/08

See application file for complete search history.

(56) References Cited

U.S. PATENT DOCUMENTS 3,070,238 A * 12/1962 Holdridge ............. B23B 13/027 220/235
4,143,774 A * 3/1979 Poulsen .................. B29C 53/74 269/48.1
5,860,340 A * 1/1999 Cucchi .................... B23B 13/02 414/14
6,202,523 B1 * 3/2001 Berns .................... B23B 13/027 414/17

(Continued)

*Primary Examiner* — Will Fridie, Jr.

(74) *Attorney, Agent, or Firm* — Matthias Scholl, PC; Matthias Scholl

(57) ABSTRACT

A nesting device for manufacturing a profile combination. The device includes: a nesting bed; a nesting base; and a rotating positioning device. The rotating positioning device includes a saddle, a first gas cylinder, two steady rests, and two rotators. The nesting bed is fixed on the ground. The nesting base is disposed and is horizontally movable on the nesting bed. The saddle is disposed on the nesting base and is horizontally movable on the nesting base. The saddle is connected to the first gas cylinder, and the first gas cylinder drives the rotating positioning device to move on the nesting base. The two steady rests are oppositely fixed on the saddle at a certain interval. The rotator is arranged inside each steady rest and is rotatable in relation to the steady rest. Each rotator includes: a square hole, and a plurality of clamps.

2 Claims, 5 Drawing Sheets

(56) References Cited

U.S. PATENT DOCUMENTS

| | | | | |
|---|---|---|---|---|
| 6,257,817 | B1 * | 7/2001 | Albasateneh | B23B 13/027 414/17 |
| 2016/0023300 | A1 * | 1/2016 | Kimura | B23K 20/12 492/1 |

* cited by examiner

DEVICE AND METHOD FOR MANUFACTURING PROFILE COMBINATION

CROSS-REFERENCE TO RELATED APPLICATIONS

This application is a continuation-in-part of International Patent Application No. PCT/CN2011/002041 with an international filing date of Dec. 7, 2011, designating the United States, now pending, and further claims priority benefits to Chinese Patent Application No. 201110044389.6 filed Feb. 22, 2011. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a device and a method for manufacturing a load-bearing member, and more particularly to a nesting device and a nesting method for manufacturing a nested profile combination.

2. Description of the Related Art

A typical nested profile combination composed of a first profile member and a second profile member is designed to decrease the consumption of the raw material in the production process and lower the production cost. The nested profile combination is formed by rotating the first profile member for 180° and nesting the first profile member and the second profile member together. The first profile member and the second profile member are strip members having cross sections of the same shapes and sizes.

However, the nesting of the first profile member and the second profile member are manually performed. The manual nesting has low production efficiency and low processing speed, and the geometric precision and form and position tolerance are difficult to control. Thus, the automatic production line cannot be realized, thereby resulting in low yield and low utilization of materials.

SUMMARY OF THE INVENTION

In view of the above-described problems, it is one objective of the invention to provide a nesting device for manufacturing a profile combination that is able to ensure continuous operation of a production line and the coherence of different procedures, and significantly improve the production efficiency.

It is another objective of the invention to provide a method for manufacturing a profile combination using the nesting device.

To achieve the above objective, in accordance with one embodiment of the invention, there is provided a nesting device for manufacturing a profile combination, the nesting device comprising: a nesting bed; a nesting base; and a rotating positioning device, the rotating positioning device comprising a saddle, a first gas cylinder, two steady rests, and two rotators. The nesting bed is fixed on the ground. The nesting base is disposed and is horizontally movable on the nesting bed. The saddle is disposed and is horizontally movable on the nesting base; the saddle is connected to the first gas cylinder, and the first gas cylinder drives the rotating positioning device to move on the nesting base. The two steady rests are oppositely fixed on the saddle at a certain interval. The rotator is arranged inside each steady rest and is rotatable in relation to the steady rest. Each rotator comprises: a square hole, and a plurality of clamps; the square hole passes through the rotator in a direction of a length of the rotator and matches with a profile. The clamps are arranged on an end face of the rotator surrounding the square hole. Each clamp comprises: a guide rail, and a chuck. The guide rail is fixed on the end face of the rotator, and the chuck is movable on the guide rail and leans against a first profile member. Thus, the clamps tightly lean against the profile for ensuring the nesting between the first profile member and the second profile member.

In a class of this embodiment, to ensure the first profile member to rotate within 180° and to prevent inaccurate rotation that affects the nesting and compositing process, a plurality of tooth spaces are arranged on a circumferential face of the rotator at a certain interval between each other. Two first positioning pins are inserted into two opposite tooth spaces at an angle of circumference of 180° for limiting a rotating direction of the rotator. When the rotator rotates for 180°, the first positioning pins are inserted into the corresponding tooth spaces to limit the position of the rotator on the steady rest, and to prevent the rotator from deviating from the steady rest, so that the accuracy and reliability of the nesting and compositing process is ensured.

In accordance with another embodiment of the invention, there is provided a method for manufacturing a profile combination by using the nesting device. The method comprises the following steps:

a) transporting the profile after cross section shaping to the rotating positioning device; allowing the cutting device and the profile to move synchronously when the profile touches a first detecting contact, and cutting the profile by the cutting device to yield the first profile member;

b) allowing the rotating positioning device to move on a nesting base of the nesting device, leaving a required interval between the rotating positioning device and the profile being transported;

c) rotating the first profile member for 180° by the rotating positioning device when the first profile member moves along with the rotating positioning device and touches the second detecting contact, positioning the first profile member; and resetting the cutting device and the rotating positioning device;

d) during the resetting of the rotating positioning device, transporting the profile to the rotating positioning device, and nesting and compositing the first profile member and the profile;

e) allowing the cutting device and the profile to move synchronously when the profile touches the first detecting contact again, and cutting the profile by the cutting device to yield the second profile member; continuing transporting the profile whereby pushing the second profile member and continuing nesting and compositing the second profile member and the first profile member; and f) completely nesting and compositing the first profile member and the second profile member to form the profile combination; continuing transporting the profile whereby pushing the profile combination for a subsequent process; repeating step a) for another nesting and compositing process when the profile touches the first detecting contact.

In a class of this embodiment, to achieve the linkage between the cutting device and the nesting device and to ensure the coherence between the cutting process and the nesting and compositing process, the cutting device comprises: a cutting base, and a cutter. The cutting base is disposed and is horizontally movable on the nesting bed. The cutting base is in rigid connection with the nesting base. The cutting base is connected to a second gas cylinder for driving the cutting base to move on the nesting bed. The cutter is disposed on the cutting base. The nesting base is provided with a cutting stopper and a positioning stopper in a direction of a length of the nesting base. The cutting stopper is used to control the cutting. The positioning stopper is used to control the rotation of the rotating positioning device. A resetting stopper is arranged on one side of the nesting bed close to the cutting base for limiting a movement of the cutting base. Because the cutting base and the nesting base are in rigid connection, once the cutting device is reset, the nesting base is synchronously reset. Besides, the second profile member and the first profile member are ensured to have the same positioning reference and the same cutting length.

In a class of this embodiment, to prevent the stopper from interfering with the metal strip thereby successively transporting the metal strip and the profile on the production line, the cutting stopper and the positioning stopper are upwardly and downwardly stretchable stoppers. The cutting stopper and the positioning stopper are used to detect positions of the metal strip or the cut profile member on the production line, as well as control the motion of the cutter and the rotator. The stretch of the cutting stopper and the positioning stopper is controlled by corresponding gas cylinders. To detect the positions of the metal strip or the cut profile member, piston rods of the gas cylinders push the stoppers upwards; after the detection of the positions, the piston rods of the gas cylinders retracts to allow the stoppers move downwardly.

Advantages of the invention are summarized as follows:

The nesting device is capable of automatically nesting the first profile member and the second profile member, thereby realizing the automatic manufacture of the profile combination. Compared with the manually nesting, the device of the invention highly improves the work efficiency. Furthermore, the mechanical structure of the nesting device improves the quality of the nesting and compositing process, and prevents the profile combination from deformation. Finally, the nesting device is provided with the clamps that are able to lean against the profile combination, thereby ensuring the reliable nesting of the first profile member and the second profile member, and improving the intensity and the quality of the nesting.

BRIEF DESCRIPTION OF THE DRAWINGS

The invention is described hereinbelow with reference to the accompanying drawings, in which.

DETAILED DESCRIPTION OF THE EMBODIMENTS

Figure 1:
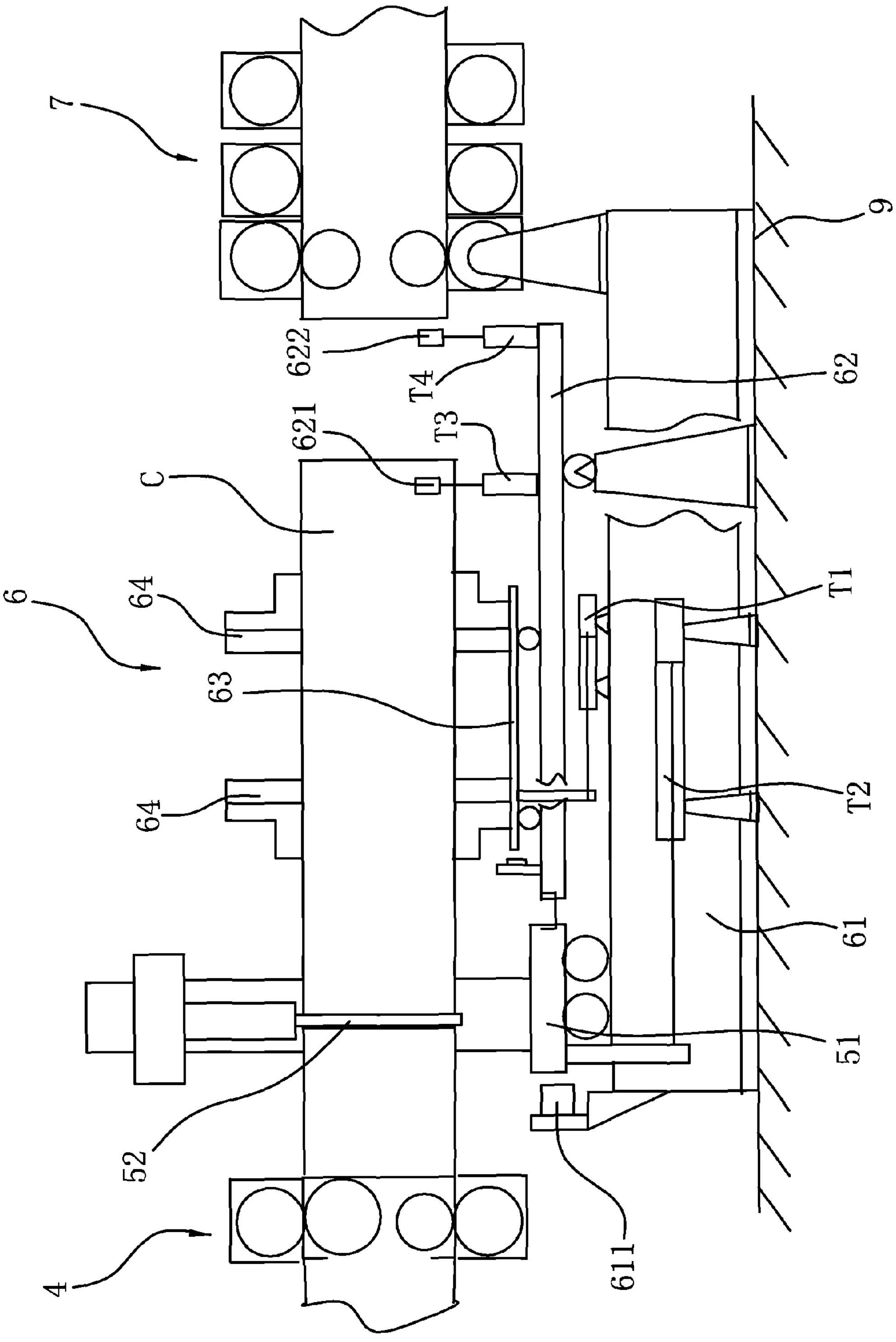
FIG. 1 is a structure diagram of a nesting device (connected to a cutting device) in accordance with one embodiment of the invention.
Figure 2:
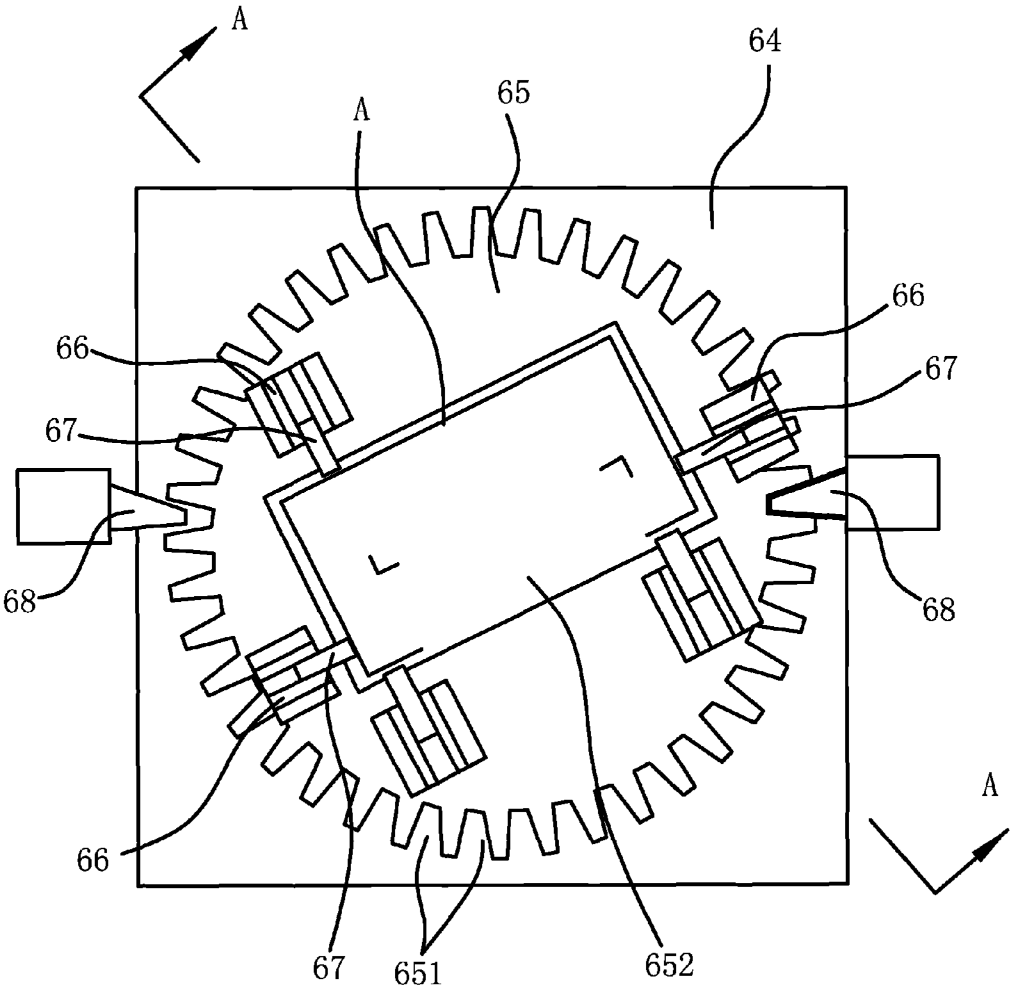
FIG. 2 is a structure diagram of a nesting device in an axial direction of a production line of FIG. 1 in accordance with one embodiment of the invention.
Figure 3:
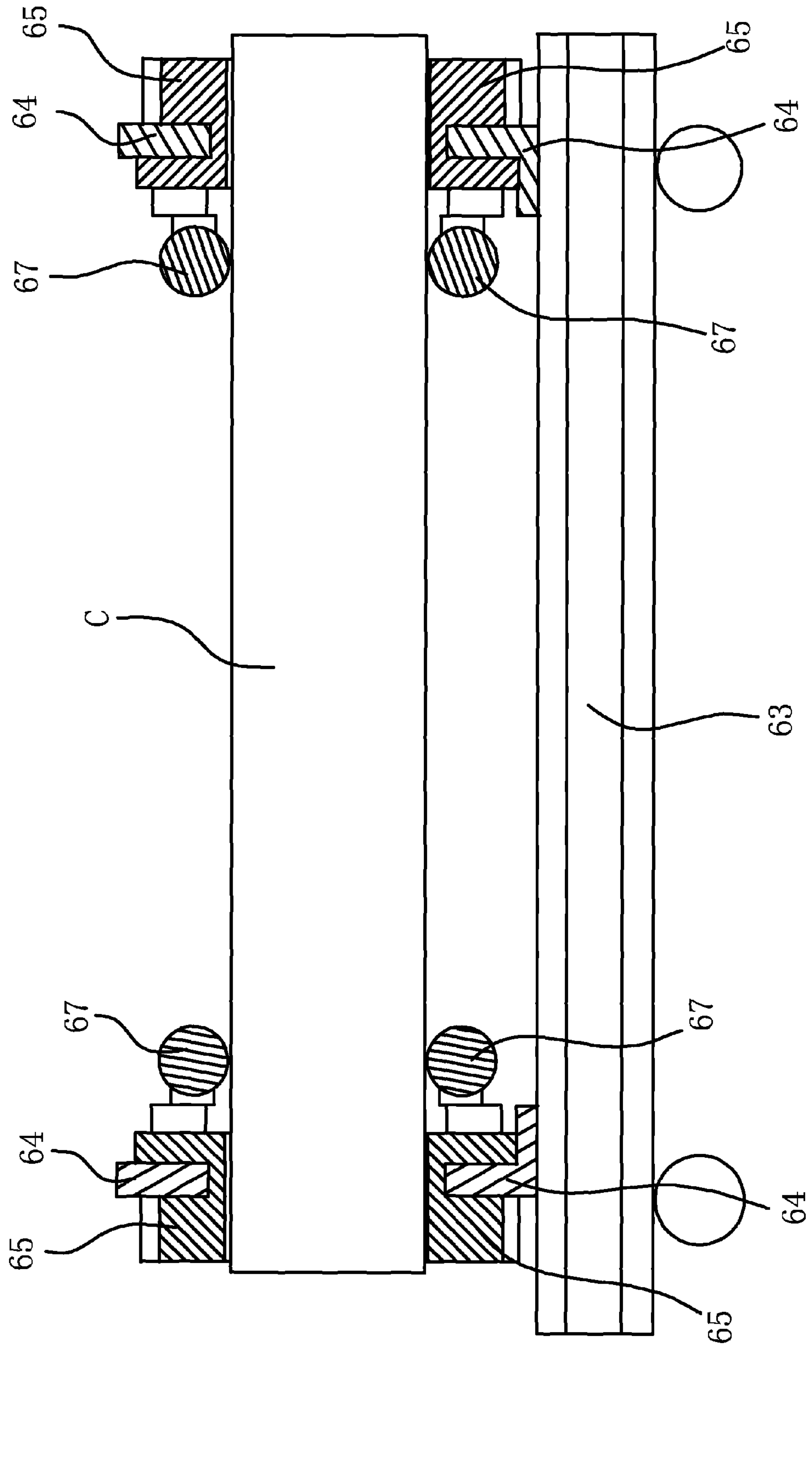
FIG. 3 is a structure diagram of part A-A of a nesting device of FIG. 1 in accordance with one embodiment of the invention.
Figure 4:
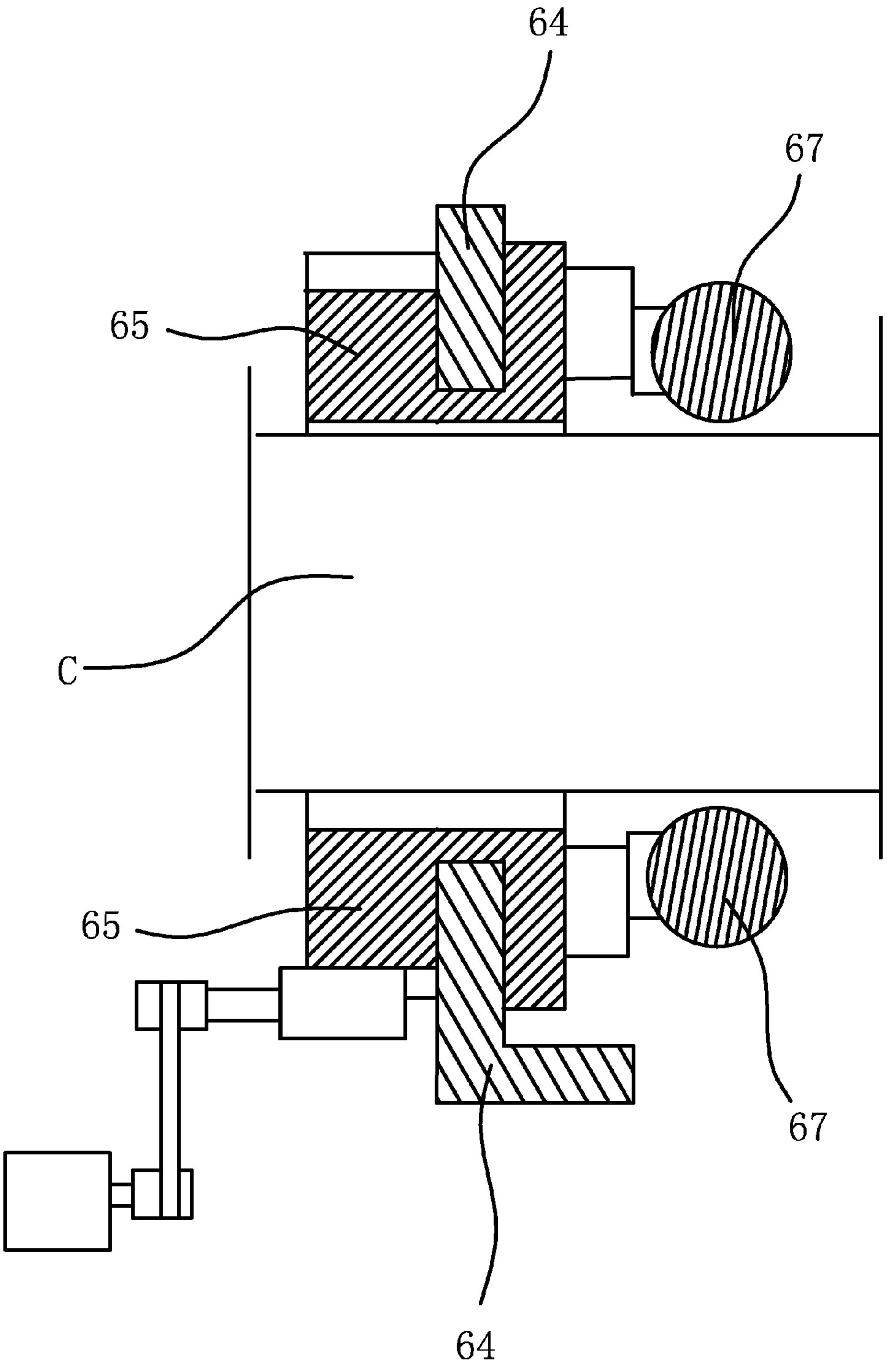
FIG. 4 is a structure diagram of a transmission structure of a nesting device of FIG. 3 in accordance with one embodiment of the invention.

For further illustrating the invention, experiments detailing a device and a method for manufacturing a profile combination are described below. It should be noted that the following examples are intended to describe and not to limit the invention.

As shown in FIGS. 1-4, a nesting device 6 comprises: a nesting bed 61; a nesting base 62; and a rotating positioning device, the rotating positioning device comprising a saddle 63, a first gas cylinder T1, two steady rests 64, and two rotators 65. The nesting bed 61 is fixed on the ground 9. The nesting base 62 is disposed and is horizontally movable on the nesting bed 61. The saddle 63 is disposed and is horizontally movable on the nesting base 62. The saddle 63 is connected to the first gas cylinder T1, and the first gas cylinder T1 drives the rotating positioning device to move on the nesting base 62. The two steady rests 64 are oppositely fixed on the saddle 63 at a certain interval. The rotator 65 is arranged inside each steady rest 64 and is rotatable in relation to the steady rest 64.

A plurality of tooth spaces 651 are arranged on a circumferential face of the rotator 65 at a certain interval between each other. Two first positioning pins 68 are inserted into two opposite tooth spaces 651 at an angle of circumference of 180° for limiting a rotating direction of the rotator 65. When the rotator 65 rotates for 180°, the first positioning pins 68 are inserted into the corresponding tooth spaces to limit the position of the rotator on the steady rest, and to prevent the rotator from deviating from the steady rest, so that the accuracy and reliability of the nesting and compositing process is ensured. Each rotator 65 comprises a square hole 652 and a plurality of clamps. The square hole 652 passes through the rotator 65 in a direction of a length of the rotator 65 and matches with a profile B. Each clamp comprises: a guide rail 66, and a chuck 67. The guide rail 66 is fixed on the end face of the rotator 65, and the chuck 67 is movable on the guide rail 66 and leans against a first profile member. The clamps are arranged on an end face of the rotator surrounding the square hole 652. The rotator 65 is capable of clamping profiles of different sizes and shapes by adjusting the position of the chuck in relation to the guide rail 66.

A cutting device 5 comprises: a cutting base 51, and a cutter 52. The cutting base 51 is disposed and is horizontally movable on the nesting bed 61. The cutting base 51 is in rigid connection with the nesting base 62. The cutting base 51 is connected to a second gas cylinder T2 for driving the cutting base 51 to move on the nesting bed 61. The cutter 52 is disposed on the cutting base 51. The nesting base 62 is provided with a cutting stopper 621 and a positioning stopper 622 in a direction of a length of the nesting base 62. The cutting stopper 621 is used as a first detecting contact to detect a position of the profile B and control the motion of the cutter 52. The positioning stopper 622 is used as a second detecting contact to detect a position of the first profile member and to control the rotation of the rotating positioning device. A resetting stopper 611 is arranged on one side of the nesting bed 61 close to the cutting base 51 for limiting a movement of the cutting base 51. Because the cutting base and the nesting base are in rigid connection, once the cutting device is reset, the nesting base is ensured to synchronously reset. Besides, the second profile member and the first profile member are ensured to have the same position reference and the same cutting length.

The cutting stopper 621 and the positioning stopper 622 are upwardly and downwardly stretchable stoppers. The cutting stopper 621 is connected to a piston rod of a third gas cylinder T3, and the positioning stopper 622 is connected to a piston rod of a fourth cylinder T4. The cutting stopper 621 and the positioning stopper 622 are used to detect positions of the metal strip or the cut profile member on the production line, as well as control the motion of the cutter and the rotator. To detect the positions of the metal strip or the cut profile member, piston rods of the gas cylinders push the stoppers upwards; after the detection of the positions, the piston rods of the gas cylinders retracts to allow the stoppers move downwardly.

The profile B is cut by the cutter 5 to yield a first profile member and a second profile member. The first profile member and the second profile member are nested by the nesting device to form the profile combination. The nesting and compositing process comprises the following steps:

a) transporting the profile B after cross section shaping to the rotating positioning device in a direction of the production line; allowing the cutting device 5 and the profile B to move synchronously when the profile B touches the first detecting contact, and cutting the profile B by the cutting device 5 to yield the first profile member;

b) allowing the rotating positioning device to move on the nesting base 62 of the nesting device 6, leaving a required interval between the rotating positioning device and the profile B being transported;

c) rotating the first profile member for 180° by the rotating positioning device when the first profile member moves along with the rotating positioning device and touches the second detecting contact; and resetting the cutting device 5 and the rotating positioning device;

d) during the resetting of the rotating positioning device, transporting the profile B to the rotating positioning device, and nesting and compositing the first profile member and the profile B;

e) allowing the cutting device 5 and the profile B to move synchronously when the profile B touches the first detecting contact again, and cutting the profile B by the cutting device 5 to yield the second profile member; continuing transporting the profile B whereby pushing the second profile member to allow the second profile member and the first profile member to be continued nesting and compositing; and f) completely nesting and compositing the first profile member and the second profile member to form the profile combination C; continuing transporting the profile B whereby pushing the profile combination C for a subsequent process; repeating step a) for another nesting and compositing process when the profile B touches the first detecting contact.

Figure 5:
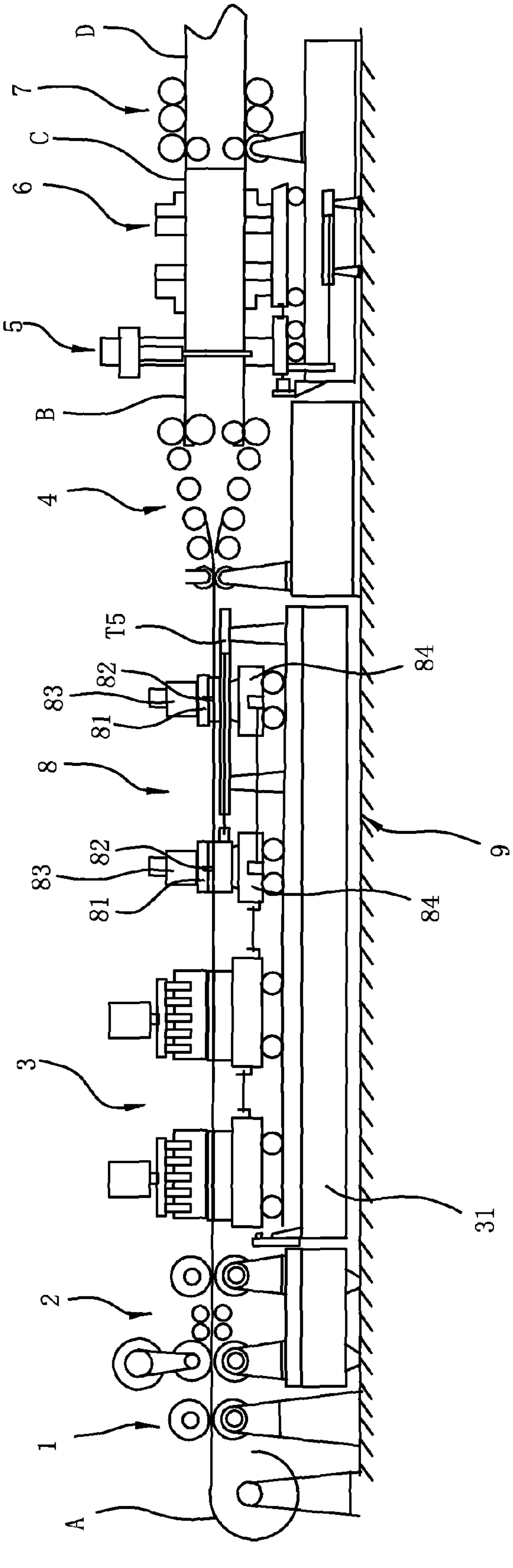
FIG. 5 is a structure diagram of a production line for manufacturing a nested profile combination in accordance with one embodiment of the invention.

As shown in FIGS. 5, a system for manufacturing a nested profile combination is an automatic production line comprising a plurality of procedures. The metal strip A transported into a feeder is employed as a raw material. The metal strip A is automatically transported to subsequent procedures along the production line. The system comprises the following devices in an order of arrangement thereof on the production line:

A profile planisher 1, the profile planisher 1 is used to planish the metal strip A transported to the production line.

A first rolling die set 2, the first rolling die set 2 is fixed on the ground 9 and comprises a plurality of first rolling sets for forming a required stiffener.

A punching device 3, the punching device 3 comprises: a punching bed 31 fixed on the ground 9; a punching machine being horizontally movable on the punching bed 31; a fifth gas cylinder T5 fixed on the punching bed 31 and driving the punching machine to move on the punching bed 31; and a pressing device 8. The pressing device 8 comprises: a pressing plate 81, an oil cylinder 83, and a pressing base 84. The oil cylinder 83 drives the pressing plate 81 to move upwardly and downwardly. The pressing base 84 drives the pressing plate 81 to move horizontally on the punching bed 31 and is in rigid connection with the punching machine. A piston rod of the fifth gas cylinder T5 is in rigid connection with the pressing base 84. A second positioning pin 82 is arranged on a bottom of the pressing plate 81. The second positioning pin 82 is capable of passing through shaped through holes of the metal strip A during the punching process. During the punching process, the punching machine moves along with the metal strip. When the punching process is completed, the second positioning pin 82 is inserted into the through hole for positioning, and the punching machine is reset by the fifth gas cylinder T5 after the punching process.

A second rolling die set 4, the second rolling die set 4 is fixed on the ground 9 and comprises a plurality of second rolling sets to form a required cross section of the profile B. The required cross section of the profile B comprises: a transverse side, a lateral side, an embedded flanging, an encircling flanging, and a bent part.

The cutting device 5 that is used to cut the profile to yield the first profile member and the second profile member.

The nesting device 6 that is used to rotate the first profile member for 180°, position the first profile member, and nest the first profile member and the second profile member to form the profile combination C.

A third rolling die set 7. The third rolling die set 7 comprises a third rolling set. The third rolling set is used to shape the encircling flangings into fixing flangings.

A method for manufacturing the nested profile combination, the method comprises the following steps:

1) planishing process: transporting the metal strip A to the profile planisher 1 for planishing, and transporting the metal strip A automatically to a subsequent process of the production line;

2) stiffener forming process: transporting the metal strip A to the first rolling die set 2, rolling the metal strip A to form the stiffener;

3) punching process: transporting the metal strip A comprising the stiffener to the punching device 3 to form through holes on the metal strip A;

4) cross section shaping process: transporting the metal strip A after being punched to the second rolling die set 4, rolling the metal strip A to yield the profile B having a cross section in a required shape, the profile B comprising the transverse side, the lateral side, the embedded flanging, the encircling flanging, and the bent part;

5) nesting and compositing process: cutting the profile B to yield the first profile member and the second profile member, nesting the first profile member and the second profile member to form the profile combination C;

6) fastening process: transporting the profile combination C to the third rolling die set 7, shaping the encircling flangings of the first profile member and the second profile member into fixing flangings for fastening corresponding lateral sides, respectively, whereby yielding the nested profile combination D; and discharging the nested profile combination D from the production line.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A nesting device for manufacturing a profile combination, the nesting device comprising:

a) a nesting bed (61);

b) a nesting base (62); and c) a rotating positioning device, the rotating positioning device comprising a saddle (63), a first gas cylinder (T1), two steady rests (64), and two rotators (65);

wherein the nesting bed (61) is fixed on the ground (9);

the nesting base (62) is disposed and is horizontally movable on the nesting bed (61);

the saddle (63) is disposed and is horizontally movable on the nesting base (62); the saddle (63) is connected to the first gas cylinder (T1), and the first gas cylinder (T1) drives the rotating positioning device to move on the nesting base (62);

the two steady rests (64) are oppositely fixed on the saddle (63) at a certain interval; the rotator (65) is arranged inside each steady rest (64) and is rotatable in relation to the steady rest (64);

each rotator (65) comprises: a square hole (652), and a plurality of clamps; the square hole (652) passes through the rotator (65) in a direction of a length of the rotator (65) and matches with a profile (B); the clamps are arranged on an end face of the rotator surrounding the square hole (652); and each clamp comprises: a guide rail (66), and a chuck (67); the guide rail (66) is fixed on the end face of the rotator (65), and the chuck (67) is movable on the guide rail (66) and leans against a first profile member.

2. The device of claim 1, wherein a plurality of tooth spaces (651) are arranged on a circumferential face of the rotator (65) at a certain interval between each other; and two first positioning pins (68) are inserted into two opposite tooth spaces (651) at an angle of circumference of 180° for limiting a rotating direction of the rotator.

* * * * *